US006445774B1

(12) United States Patent
Kidder et al.

(10) Patent No.: US 6,445,774 B1
(45) Date of Patent: Sep. 3, 2002

(54) SYSTEM FOR AUTOMATED WORKFLOW IN A NETWORK MANAGEMENT AND OPERATIONS SYSTEM

(75) Inventors: Karen L. Kidder; James M. Haring; Reid J. Bishop, all of Colorado Springs, CO (US); James D. Trent, Sun Prairie, WI (US); Lan D. Pham, Colorado Springs, CO (US)

(73) Assignee: MCI Communications Corporation, Washington, DC (US)

( * ) Notice: Subject to any disclaimer, the term of this patent is extended or adjusted under 35 U.S.C. 154(b) by 0 days.

(21) Appl. No.: 08/968,150

(22) Filed: Nov. 17, 1997

(51) Int. Cl.[7] ................................................. H04M 1/24
(52) U.S. Cl. ................. 379/9.03; 379/32.01; 379/14.01
(58) Field of Search ...................... 379/1, 9, 16, 11–15, 379/32, 34, 112, 113, 134, 136, 137, 9.01, 9.02, 9.03, 9.04, 14.01, 15.05, 24, 32.01

(56) References Cited

U.S. PATENT DOCUMENTS

| | | | | |
|---|---|---|---|---|
| 4,972,453 A | * | 11/1990 | Daniel, III et al. | 379/15 |
| 5,473,596 A | * | 12/1995 | Garafola et al. | 379/33 |
| 5,687,212 A | * | 11/1997 | Kinser, Jr. et al. | 379/14 |
| 5,699,403 A | * | 12/1997 | Ronnen | 379/32 |
| 5,761,502 A | * | 6/1998 | Jacobs | 379/220 |
| 5,790,633 A | * | 8/1998 | Kinser, Jr. et al. | 379/14 |
| 5,802,144 A | * | 9/1998 | Laird et al. | 379/32 |
| 5,852,403 A | * | 12/1998 | Hodson | 379/9 |
| 5,852,649 A | * | 12/1998 | Hodson | 379/9 |
| 5,946,373 A | * | 8/1999 | Harris | 379/26 |

* cited by examiner

Primary Examiner—Curtis Kuntz
Assistant Examiner—Rexford N Barnie

(57) ABSTRACT

Methods and systems for automating the dissemination and processing of alarm reports received from a telecommunications network are provided. Alarm reports, which are provided to network monitors by a network management system, correspond to alarms that are generated by the telecommunications network. Network monitors view these alarm reports and group them together to form event reports. The network monitors then use the event reports to produce trouble reports that are processed by a trouble management system. The trouble management system dispatches field engineers to repair networks anomalies in accordance with these trouble reports. An automated workflow system provides automated alarm report dissemination and processing. The automated workflow system provides a graphical interface to view and manipulate alarm reports and to automatically create and handle event reports and trouble tickets. The workflow system also allows network monitors to identify which network component within the telecommunications network generated a specific alarm and to append telecommunications network site and topology data to event reports. The automated workflow system also tracks the status of the trouble tickets subsequent to their creation and automatically updates associated event and alarm reports.

29 Claims, 11 Drawing Sheets

SYSTEM FOR AUTOMATED WORKFLOW IN A NETWORK MANAGEMENT AND OPERATIONS SYSTEM

TECHNICAL FIELD

The present invention relates to the detection, reporting, and resolution of anomalies in a telecommunications network, and more particularly to the automation of the anomaly handling and resolution procedures that are associated with such a telecommunications network.

BACKGROUND OF THE INVENTION

A modem telecommunications network is an extremely complex system composed of a plethora of network components. To ensure that the telecommunications network remains in proper working condition, the performance of these various network components is continuously monitored by network monitoring personnel, referred to hereinafter as "network monitors." The network monitors, often remotely located from the telecommunications network, monitor the network by reviewing reports of anomalies generated within the telecommunications network. The collection of systems used to monitor these anomalies is referred to as a network monitoring environment.

In the telecommunications network, alarms are assigned to various network components and sound when anomalies are detected in their respective components. In addition, the sites where the network components are physically located may be equipped with alarms and also may be monitored. Other equipment peripheral to the network may also be equipped with alarms. Each alarm is reported to the network monitors through an electronic message (an alarm report), which provides an indication of a network anomaly. The network monitors use the alarm reports to investigate and resolve the anomaly that generated the alarm.

Monitoring a telecommunications network is a complicated undertaking, especially considering the many components which comprise a typical network. Moreover, in light of the multitude of alarms attached to the network, the network monitors may be inundated periodically with alarm reports due to one or more major anomalies in the network, or even a series of small anomalies arising within a brief timespan. This tremendous volume of alarm reports can overwhelm the network monitors and hamper the process of returning the telecommunications network to proper working condition.

In conventional network monitoring environments, network monitors receive alarm reports from the telecommunications network and then manually process these alarm reports. Processing an alarm report provides an orderly procedure for resolving the anomaly that generated an alarm. The processing of alarm reports to resolve network anomalies typically entails retrieving from paper manuals network parameter information, such as equipment operating characteristics; consulting telephone directories to find telephone numbers for remote network sites; and optionally, completing hard copy telecommunications trouble forms, referred to as trouble tickets or service reports. A network monitor prepares a trouble ticket, also known as a service report, when action by a field engineer appears necessary in order to resolve the anomaly causing an alarm. Field engineers are typically telecommunications personnel who service the telecommunications network (e.g., replacing a faulty transformer at a specific location).

In conventional network monitoring environments, a network monitor prepares a trouble ticket using some type of service management system, for example, a trouble management system ("TMS"). Conventional TMSs are separate computer systems from the telecommunications network where the alarm reports are generated. As a result, a network monitor must manually copy the alarm report information to create a trouble ticket in the TMS. In addition, once the trouble ticket is submitted to the TMS, the network monitor receives status update information from the TMS. However, a network monitor may not typically select the type of status update information received from the TMS.

FIG. 1 is a block diagram depicting the logical architecture of a conventional network monitoring environment. The network monitoring environment comprises a telecommunications network 107, a network management system 100, network monitors 104, a TMS 105, and field engineers 106. The telecommunications network 107 consists of various components from electronic equipment, wires, and transformers to sites in which this equipment is housed. The network management system 100 typically includes an alarm handling function module ("FM") 101, an alarm handling presentation module ("PM") 102, and an iconic map PM 103. The network management system 100 receives alarm reports generated by components of the telecommunications network 107 due to an anomaly detected within a component. Network monitors 104 receive the alarm reports from the alarm handling PM 102 and initiate the process of correcting the anomalies that generated the alarm reports. The network monitors 104 may use the information from the alarm reports to create trouble tickets using the TMS 105. The TMS 105 provides a system for dispatching field engineers 106 to the physical location of a reported anomaly based upon the created trouble tickets. The field engineers 106 investigate and correct the reported anomaly.

In a typical operation, a network monitor, such as network monitor 104, is assigned to monitor the telecommunications network at a particular location in the network or to monitor a particular type of network component. The network monitor typically uses a computer workstation to perform the monitoring procedures. In presently available network monitoring environments, when a network management system, such as a network management system 100, receives an alarm report, it is generally assigned manually to the proper network monitor (by routing it to the appropriate workstation). Having received the alarm report, the network monitor may first attempt to verify the anomaly represented by the alarm report, or the network monitor may attempt to resolve the anomaly by telephoning personnel located at the site from which the alarm originated. For example, a network monitor may receive an alarm report indicating that a door has been opened at a remote network station by someone who did not enter a proper authorization code prior to entering. In response to such an alarm, the network monitor typically consults a paper telephone book of network site personnel to locate the telephone number of the corresponding site manager or a subordinate. The network monitor then telephones the site and verbally informs appropriate personnel that the open door alarm has occurred.

On the other hand, the alarm report received by a network monitor may indicate a condition, such as a break in a communications line, which the network monitor cannot resolve and which will ultimately require the attention of a field engineer, such as field engineer 106. In order to bring this alarm to the attention of the field engineering staff, conventional network monitoring environments require the network monitor to manually create a trouble ticket on a TMS, such as TMS 105, and to copy the relevant information manually from the alarm report into the trouble ticket for processing by a TMS. To complete the trouble ticket properly, the network monitor typically adds additional information, some of which the network monitor generally finds by referencing paper manuals that contain, for example, site, topology, or equipment information.

A network monitor may often determine that multiple alarm reports received from the telecommunications network can be grouped together to facilitate processing. For example, the network monitor may believe that the alarm reports have a common source or are otherwise related. The selection of either a single alarm report or the grouping of multiple alarm reports together to facilitate processing is known as creating an "event" to those skilled in art. An alarm typically represents the mere appearance of an anomaly within a particular network component. An event, on the other hand, represents the logical grouping of multiple network anomalies, or apparent aiomalies. For example, if a tree falls over during a thunderstorm and cuts through a major telecommunications line, at least one, and perhaps dozens, of alarms will sound. However, all of these alarms can be logically grouped together into one event, the event being the single cut in a line caused by a thunderstorm.

Events are documented in forms known as event reports. Thus, while the network monitor collects alarm reports, the network monitor actually processes and resolves event reports. In a conventional network monitoring environment, the network monitor will append the corresponding (component) alarm reports to an event report. The event report itself may be annotated with other useful information by the network monitor.

The ease in which alarm reports can be processed by network monitors has improved somewhat by the recent development of network management systems. A network management system, such as network management system 100, typically resides between a network monitor and the network components and collects, stores, and manages the alarm reports produced by the network components and presents the alarm reports to the network monitors. The network management system provides object models for storing and distributing the alarm reports received from the telecommunications network. For example, alarm handling FM 101 collects and stores alarm reports as objects; alarm handling PM 102 displays alarm reports to a network monitor, and iconic map PM 103 displays in graphical form the telecommunication network with alarm locations superimposed over the network map.

An example of an existing network management system is the Telecommunications Management Information Platform ("TeMIP"), which was built by Digital Equipment Corporation ("DEC"). TeMIP collects, stores, and manages network alarm reports as data objects. TeMIP also provides a presentation manager for presenting to a network monitor all alarm reports collected from the network. However, no presently available network management system, including TeMIP, provides functionality for automating a network monitor's activities or provides an adequate bridge between the telecommunications network and the TMS 105. Moreover, presently available network management systems provide only limited information on each alarm report. Many procedures must still be done manually by the network monitors.

In summary, presently available network monitoring environments provide only rudimentary support for a network monitor's activities. None provide adequate support for the network monitor's trouble response duties, such as resolving alarm reports manually or by issuing a trouble ticket. For example, the proper response period for certain critical alarms can be as small as a few seconds. Current network monitoring environments have not sufficiently reduced the response period to achieve this level of responsiveness. As discussed above, current network monitoring environments are very limited in the features they provide for network monitors, and such network monitoring environments cannot be easily tailored to accommodate the workflow of network monitors.

SUMMARY OF THE INVENTION

Embodiments of the present invention provide methods and systems for automating the dissemination and processing of alarm reports received from a telecommunications network. Alarm reports, which correspond to alarms generated by the telecommunications network, are provided by a network management system to network monitors. A network monitor can select one or more alarm reports for grouping into an event report. The network monitor can use the event report in resolving the alarm report and can also use the event report to produce a trouble ticket for further processing by a service management system, such as a trouble management system ("TMS").

To provide the automated dissemination and processing of alarm reports, embodiments of the present invention provide a network monitoring tool, referred to as an automated workflow system, which automates the workflow of network monitors. The automated workflow system also provides automated event report and trouble ticket handling. For example, a network monitor may select alarm reports and create an event report based on those alarm reports. The network monitor may also optionally create a trouble ticket for that event. The automated workflow system automatically creates the event reports and trouble tickets, incorporates the relevant alarm information, and incorporates other related data. For example, network site and topology information may be incorporated. The automated workflow system may utilize external systems, such as remote databases, to provide the information for the event report or the trouble ticket. Alternatively, the information may be stored within the automated workflow system.

In one embodiment, the automated workflow system provides a set of tools that can be implemented in a network monitoring environment. These tools automate network monitor procedures such as creating events, assigning alarm reports to events, creating trouble tickets against events, assigning trouble tickets to network monitors, tracking trouble tickets, updating alarm report status to indicate which alarm reports have been handled by a trouble ticket, and updating alarm report status to indicate which alarm reports have been cleared by the closing of an event. In addition, feedback loops have also been built into these automation processes to apprise network monitors of developments associated with resolving network-generated alarms.

In a further embodiment, the automated workflow system may automate the functions of a network monitor using rules-based artificial intelligence technology. The artificial intelligence technology may either fully automate the network monitor's functions or may operate semi-autonomously to support the network monitors.

DETAILED DESCRIPTION OF THE INVENTION

Figure 1:
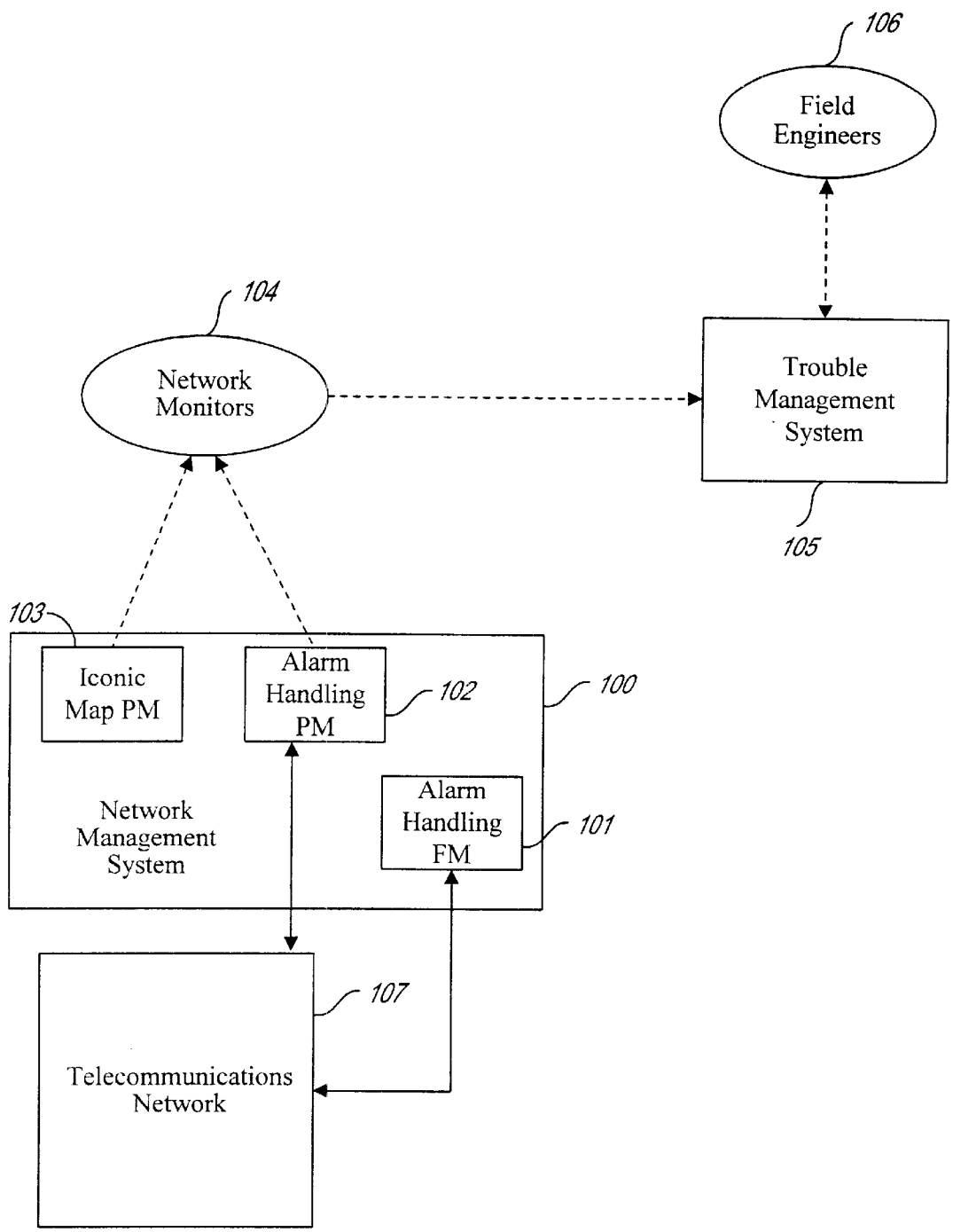
FIG. 1 is a block diagram depicting the logical architecture of a conventional network monitoring environment.

Embodiments of the present invention provide methods and systems for automating the dissemination and processing of alarm reports received from a telecommunications network. Through a network management system, a network monitor receives alarm reports that correspond to alarms generated by the telecommunications network. Each alarm indicates an occurrence of an anomaly in a component of the network. Using the tools provided by embodiments of the present invention, the network monitor may electronically group one or more alarm reports together into an event report, which may be automatically annotated as appropriate. In addition, the network embodiments of the present invention also automate the network monitor's interface to service management systems, such as trouble management systems, where telecommunications network anomalies are scheduled for repair. The automated interface to the trouble management system ("TMS") includes automatically creating and monitoring trouble tickets (service reports). As a result, network monitors are no longer constrained to manually process alarm reports and to manually compose trouble tickets on a separate, unrelated system. Through such automation, embodiments of the present invention reduce the labor-intensive, time-intensive nature of monitoring and responding to anomalies in the telecommunications network.

To accomplish these automation and dissemination functions, embodiments of the present invention provide an automated workflow system. The automated workflow system is a set of tools for interfacing network monitors, service management systems such as TMSs, and network management systems. The automated workflow system provides a graphical interface that supports the network monitors in generating event reports and providing trouble tickets to field engineers. The tools provided by the automated workflow system automate many of the operations of the network monitors, thereby streamlining the workflow of the network monitors. For example, the tools automatically generate service reports from event reports.

As discussed further below with respect to FIG. 4, the automated workflow system includes: a client GUI, a station manager, a workflow loosely coupled application ("LCA"), an event database, a common data platform ("CDP"), a notification manager, a gateway process, a rules manager, and a computerized server. The client GUI works with the station manager and the workflow LCA to present alarm reports to the network monitors. The CDP, workflow LCA, and client GUI work together to provide network monitors with additional data enhancing the alarm reports. The client GUI, computerized server, and event database work together to store event reports completed by the network monitors. The client GUI and gateway work together to provide service reports to the service management system. The gateway, notification manager, and client GUI work together to provide service report updates to the network monitors. The rules manager invokes rules for performing functions such as alarm report handling, event report handling, and service report handling based upon the occurrence of selected actions within the network monitoring environment.

Figure 2:
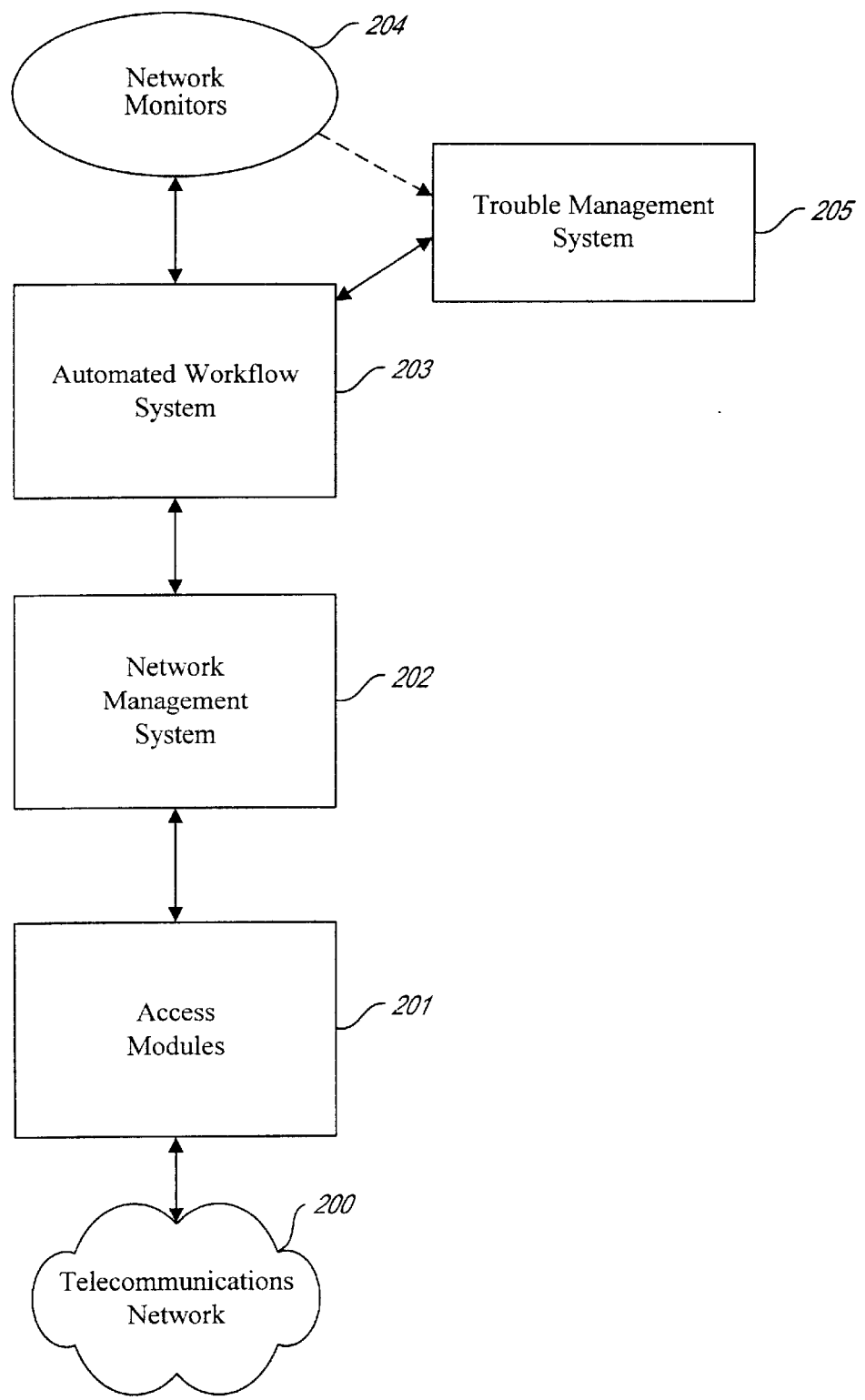
FIG. 2 provides a logical representation of the location of an exemplary embodiment of an automated workflow system in a network monitoring environment.

FIG. 2 provides a logical representation of the location of an exemplary embodiment of an automated workflow system in a network monitoring environment. The network monitoring environment includes multiple layers of functionality comprising a telecommunications network 200, access modules 201, a network management system 202, the automated workflow system 203, a trouble management system 205, and network monitors 204. The telecommunications network 200 includes the various network components that comprise the network. These network components generate alarms, which are typically associated with anomalies in a corresponding network component. Access modules 201 provide an interface between the components of the telecommunications network 200 and the higher level network monitoring functions, such as the functions provided by network management system 202. Access modules 201 typically receive alarm reports and other messages, from the network components, in a predetermined format. The alarm reports are sent by the access modules 201 to the network management system 202 which prepares the alarm reports for display.

The automated workflow system 203 of the network monitoring environment provides an interface between the network monitors 204 and the systems with which they must interact, such as the network management system 202 and the TMS 205. The network monitors 204 are typically personnel of the communications company who operate the network and are responsible for monitoring the network and responding to anomalies. Network monitors 204 view and analyze the alarm reports produced by the network management system 202, determine the set of events that best represents the alarm reports, identify which events represent some sort of anomaly with the network, and take action to resolve the anomaly. The network environment may also include a sub-network manager, who performs alarm filtering and other functions. The automated workflow system 203 automates much of the operations that are performed by the network monitors 204. Although many aspects of this description refer to the network monitors 204 as persons, one skilled in the art will recognize that the functions of the network monitors may be alternatively provided, for example, by automated or semi-automated apparatuses.

The automated workflow system 203 also provides an interface between the network management system 202 and the TMS 205. This interface provides three primary functions: alarm report handling, event report handling, and trouble ticket handling. The TMS 205 is responsible for distributing the trouble tickets to the field engineers for appropriate servicing. In a typical embodiment, the TMS 205 and network management system 202 are existing systems. The automated workflow system 203 is responsible for interfacing to the existing protocols of these systems.

Figure 3:
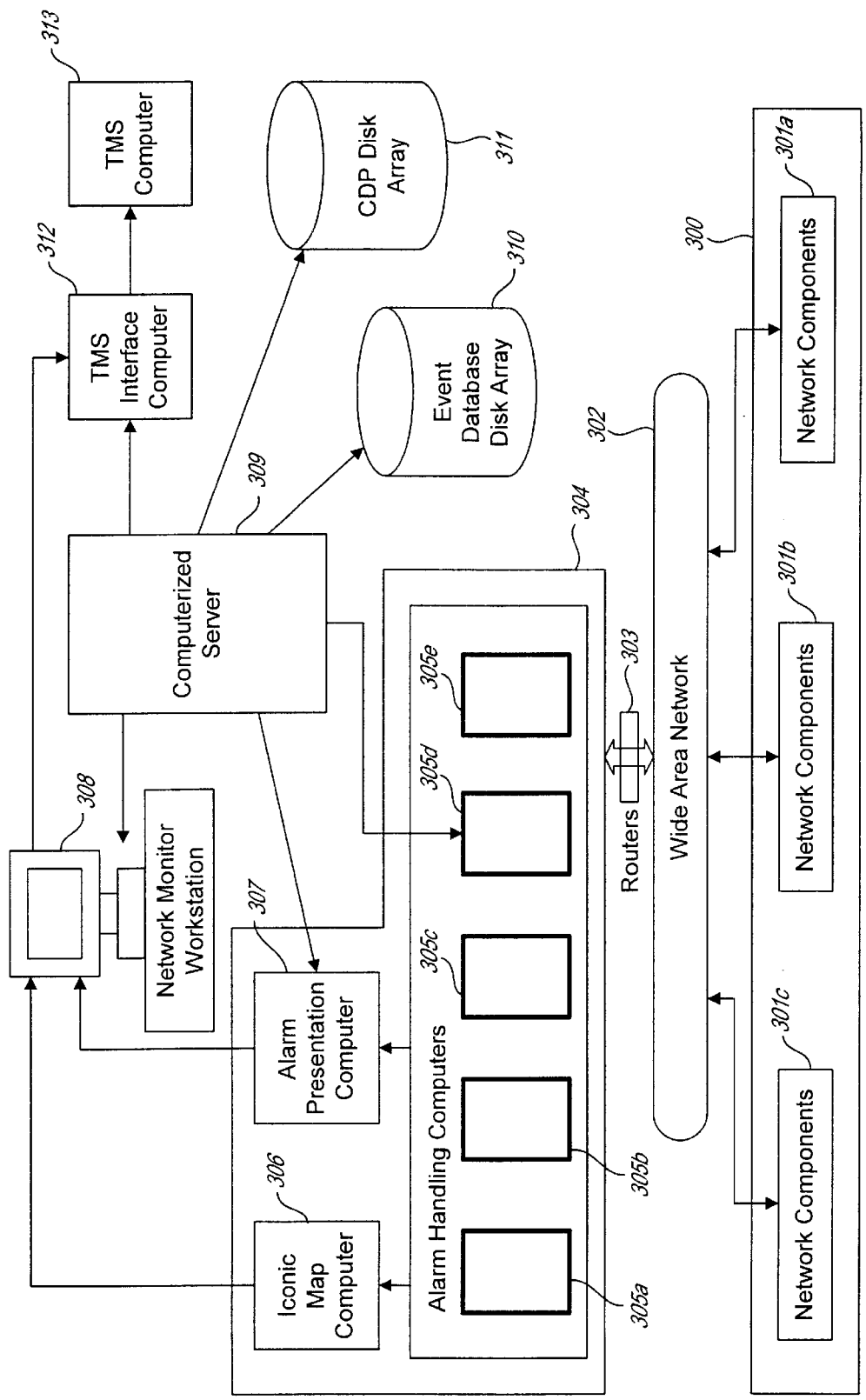
FIG. 3 depicts an exemplary embodiment of a hardware architecture suitable for hosting an automated workflow system.

FIG. 3 depicts an exemplary embodiment of a hardware architecture suitable for hosting an automated workflow system. The telecommunications network 300 comprises network components 301a, 301b, and 301c. These network components can be located across the telecommunications network at various sites. The network components are equipped with alarms, which emit alarm reports. The alarm reports are electronic messages, which pass through a wide area network 302, then through a bank of routers 303, before reaching the network management system 304. The network management system 304 includes computing systems 305a–305e, which perform the alarm report handling operations. A separate computer system 306 generates an iconic map for the network, and another computer system 307 generates the alarm report presentation information. Each network monitor receives information and interacts with the automated workflow system through a network monitor workstation 308, which houses various components of the automated workflow system, such as the station manager and the client GUI. Computerized server computer system 309 houses other functions of the automated workflow system such as the notification manager, the rules manager, and the computerized server. The event database is housed in disk array 310, and the CDP is housed in disk array 311. One skilled in the art will recognize that any persistent data storage facility may be used. A computer system 312 executes the gateway process, which interfaces with a TMS system that resides on computer system 313. One skilled in the art will recognize that many other hardware configurations are possible for the hosting automated workflow system and the network environment in which it operates.

Figure 4:
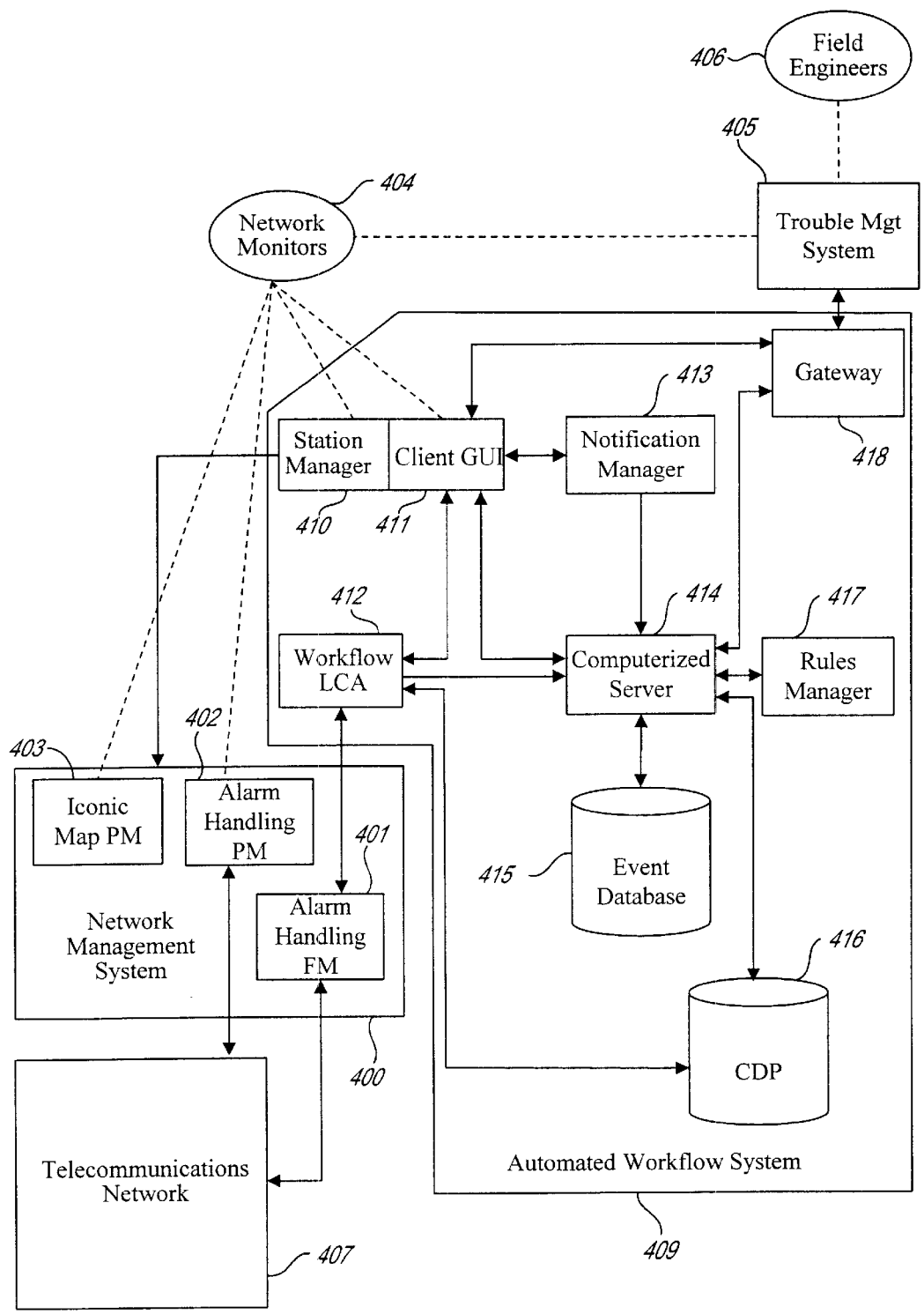
FIG. 4 illustrates a block diagram of an automated workflow system in accordance with one embodiment of the present invention.

FIG. 4 illustrates a block diagram of an automated workflow system in accordance with one embodiment of the present invention. The automated workflow system 409 interfaces with network monitors 404, a network management system 400, and a service management system TMS 405 to generate event reports and to provide trouble tickets to field engineers 406. The tools provided by the automated workflow system 409 enhance the telecommunications monitoring environment by automating or semi-automating the workflow of the network monitors 404. A network monitor 404 sits at a customized workstation while monitoring the telecommunications network 407. The network monitor's workstation provides a display of alarm reports (via alarm handling PM 402) and a map of the network (via iconic map PM 403), as provided by the network management system 400.

The automated workflow system 409 includes: a client graphical user interface ("client GUI") 411, a station manager 410, a workflow loosely coupled application ("LCA") 412, a common data platform ("CDP") 416, an event database 415, a notification manager 413, a gateway process 418, a rules manager 417 and a computerized server 414. The client GUI 411 serves as the network monitor's interface to the other tools that comprise the automated workflow system. The client GUI 411 also provides graphical forms for creating, viewing, and tracking event reports and trouble tickets. Thus, network monitors no longer need to complete paper forms to track events and trouble tickets. As discussed above, not all events warrant a trouble ticket. The client GUI allows a network monitor 404 to designate which alarm reports to assign to an event and to designate which events warrant the creation of a trouble ticket. In a preferred embodiment, the client GUI 411 is embodied in the network monitor's 404 personal workstation, although this element could also be implemented on a separate device from the monitor's workstation. Further details of the client GUI 411 are discussed below with respect to FIG. 5.

More specifically, the network monitor 404 receives alarm reports from the alarm handling PM 401 of the network management system 400, which collects them from the telecommunications network 407. The network monitor may then select one or more of these alarm reports to create an event using a "create event" function provided by the alarm handling PM 401. Recall that an event is a grouping of alarm reports to facilitate their processing. In a preferred embodiment, once at least one alarm report has been selected and the network monitor 404 has also accessed the "create event" function, then the client GUI 411 automatically displays an event report. As the network monitor 404 selects additional alarm reports for inclusion in the event, they are automatically inserted into the event report by the client GUI 411. In addition, the client GUI 411 may also annotate the event report with additional data or with comments entered by the network monitor 404. These annotations may be added at any time after the event report has been created, and may, of course, include updates to the alarm report's status.

The automated workflow system 409 also provides a station manager 410 for the network monitors 404. The station manager 410 is a software application that typically runs on a network monitor's workstation and provides the network monitor 404 with a catalog of network sites. When the network monitor 404 responds to a network anomaly, the network monitor 404 will typically first access the site specific information pertinent to the alarm report, which can be obtained through the station manager 410. To obtain site information, the network monitor 404 selects an alarm report and then selects a function within the alarm report which initiates retrieval of information for a specified site within the telecommunications network 407. In response, the station manager 410 locates a database record for that site, which is stored within the automated workflow system 409. This record comprises useful information, such as the site's location within the telecommunications network, its physical address, contact names, telephone numbers, network equipment, and topology data. Once the network monitor 404 obtains the site specific information, the network monitor 404 typically contacts the on-site personnel and apprises them of the anomaly. In some instances, the on-site personnel can resolve the anomaly and terminate the alarm generated by the telecommunications network 400.

In a preferred embodiment, the client GUI 411 is closely coupled with both the station manager 410 and the alarm handling PM 402. This close coupling facilitates the transfer of data among these components, enabling network monitors 404 to respond faster to anomalies within the telecommunications network. One skilled in the art will recognize that alternative connections between these components are possible without departing from the spirit of the present invention.

The automated workflow system 409 also provides a workflow loosely coupled application ("workflow LCA") 412 to handle the automated creation and management of event reports. The workflow LCA 412 interfaces the network management system 400 to an event database 415. When requested, the workflow LCA 412 creates an event report record in event database 415 and then automatically writes data from the selected alarm report onto the event report record, as well as additional data derived from the CDP 416.

The workflow LCA 412 automatically retrieves the alarm reports that are created by the network management system and that correspond to the created event report and enhances these alarm reports with network topology and site data. The network topology and site data does not normally reside within the telecommunications network 407 or in the network management system 400. Thus, the automated workflow system 409 through the workflow LCA 412 provides an enhancement to the basic alarm report data provided by the telecommunications network 407.

The common data platform ("CDP") 416 provides the additional data used to enhance the basic alarm report data from the telecommunications network 407. In one embodiment, the workflow LCA 412 receives this enhancement data from the CDP on a nightly download. The enhancing data received from the CDP may itself be a subset of the information resident on the CDP. The CDP data is described further below with regard to FIG. 6.

The event database 415 stores all event reports created by the network monitor through the automated workflow system 409. An event report is typically created as described above and is stored as a record in the database. The format of an event record is discussed further below with respect to FIG. 7. Each event report contains the alarm reports that were selected by the network monitor 404 to be grouped in the event. The workflow LCA 412 automatically retrieves these selected alarm reports from the network management system 400, enhances the alarm reports with network topology and site data, creates an event report in the event database, and writes the corresponding alarm report data to the event report. A computerized server 414 performs database transactions for the components of the automated workflow system 409 that interface to the event database 415.

In addition to event reports, the event database 415 may also store and maintain trouble tickets, a network monitor table, and a message table. The client GUI saves copies of trouble tickets created by the network monitors 404 in the event database. These copies can be accessed later and forwarded to other components. The message table contains status updates for previously stored event reports and trouble tickets. The network monitor table stores records that identify each network monitor 404. A network monitor record may include both login identifications and passwords, enabling a single login process for network monitors. Once a network monitor 404 logs in to the automated workflow system 409, the system 409 retrieves the appropriate network monitor record in the network monitor table; retrieves the network monitor's identifications and passwords; and logs the network monitor into the event database 415, the network management system 400, the station manager 410, and the TMS 405. The automated workflow system 409 also uses the network monitor records to identify the network monitor workstation to notify of updates to existing events and trouble tickets.

The notification manager 413 polls the message table stored in the event database 415 for new messages and processes them. If a message corresponds to the creation of a new event report, then the notification manager sends a message to a message screen on the client GUI 411 of the appropriate network monitor workstation. For example, when the workflow LCA 412 creates an event report, it also writes a message in the message table in the event database 415 indicating that an event report has been created. Other types of messages, such as an update to an event report, that are written to the message table in the event database 415 are also read by the notification manager 413 and distributed appropriately. The notification manager 413 uses the network monitor table to identify a workstation or client GUI 411 process that is to receive the notification message. When the notification manager sends the message to the client GUI, a message screen automatically pops up on the workstation, notifying the network monitor 404 of the message.

The gateway process 418 is a computer process which interfaces the automated workflow system 409 to the TMS 405. The gateway process 418 is a store and forward computer application which writes trouble ticket data prepared by a network monitor 404 to a trouble ticket record in the TMS 405. When a trouble ticket is created in the event database 415, the gateway process 418 automatically detects the ticket's creation, copies the trouble ticket, and then sends the trouble ticket to the TMS 405. When the gateway process 418 receives trouble ticket data from the event database 415, the gateway process 418 stores the trouble ticket data until it can be forwarded to the TMS 405. The gateway process 418 essentially opens a trouble ticket in the TMS 405. When the TMS 405 assigns a TMS number to the ticket, the gateway process 418 retrieves the TMS number and updates a field in the trouble ticket in the event database 415. The gateway process 418 also writes a message to the message table, indicating an event record update. In this embodiment, the gateway process 418 performs the database call to update the event report with the TMS ticket number, and to write the notification message in the message table.

Alternatively, the network monitor can create trouble tickets using the client GUI 411 which are directly forwarded the TMS 405, but if communications to the TMS have been disrupted, use of the event database enables the network monitor to continue to create trouble tickets without disruption. When communications with the TMS are disrupted, the trouble tickets are simply stored in the event database 415 until the communications are restored. Once communications have been restored, the event database 415 simply forwards all pending TMS data, such as trouble tickets, to the TMS via the gateway process 418.

The rules manager 417 is an inference engine, such as that provided by artificial intelligence technology, which invokes rules to perform various functions automatically based upon detecting the occurrence of certain actions within the system. Rules invoked by the rules manager 417 are applied to the event database 415 through calls to the computerized server 414. A rule can be applied to any portion of the data in the event database 415. For example, a predetermined amount of elapsed time could be used as a condition to invoke a rule which changes the processing status of an event report (for example, from "not expired" to "expired"). Specifically, each event report typically stores a specific time limit for the lifetime of the event report. A rule invoked by the rules manager 417 will search the event reports stored in the event database 415 to determine for each examined event report if a sufficient time has passed to change the status of an event report to "expired" based on the specified time. If the rules manager 417 locates an expired event report, the rules manager will write a message indicating an expired event report to the event database 415 which will be forwarded to the notification manager 413. Other status handling and monitoring duties can also be handled automatically by the rules manager.

The computerized server 414 performs database transactions with the event database 414. The computerized server 414 also performs the downloading of information (e.g., the network topology and site information) from the CDP 416. In addition, the computerized server provides data communications between the notification manager 413, the gateway process 418, the client GUI 414, and the workflow LCA 412. In one embodiment, the event database 415 and corresponding computerized server 414 are implemented according to an SQL server database format. One skilled in the art will recognize that other database technology is operable with the present invention.

Figure 5:
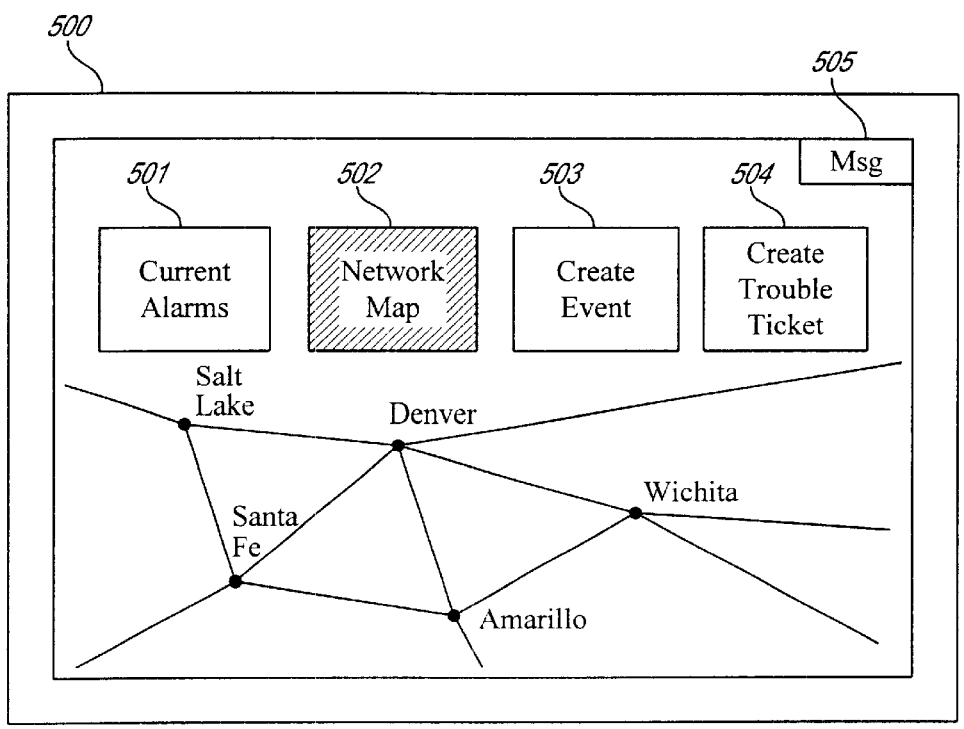
FIG. 5 illustrates an example screen display of an embodiment of the client GUI executing on a network monitor's workstation.

FIG. 5 illustrates an example screen display of an embodiment of the client GUI executing on a network monitor's workstation. The screen display 500 shows a series of button icons 501–505, which may be selected using an input device such as a mouse. The display 500 provides buttons for a network monitor's primary responsibilities. For example, the current alarms button 501 supports viewing current alarm reports. Buttons 502–505 provide access to functions for viewing a network map, creating an event report, creating trouble tickets, and viewing messages, respectively. Selecting one of these buttons changes the display and may include the generation of a computerized form, such as a form for creating a trouble ticket. The display depicted in FIG. 5 also shows a section of a network map, which a network monitor has selected by accessing the network map icon 502.

Figure 6:
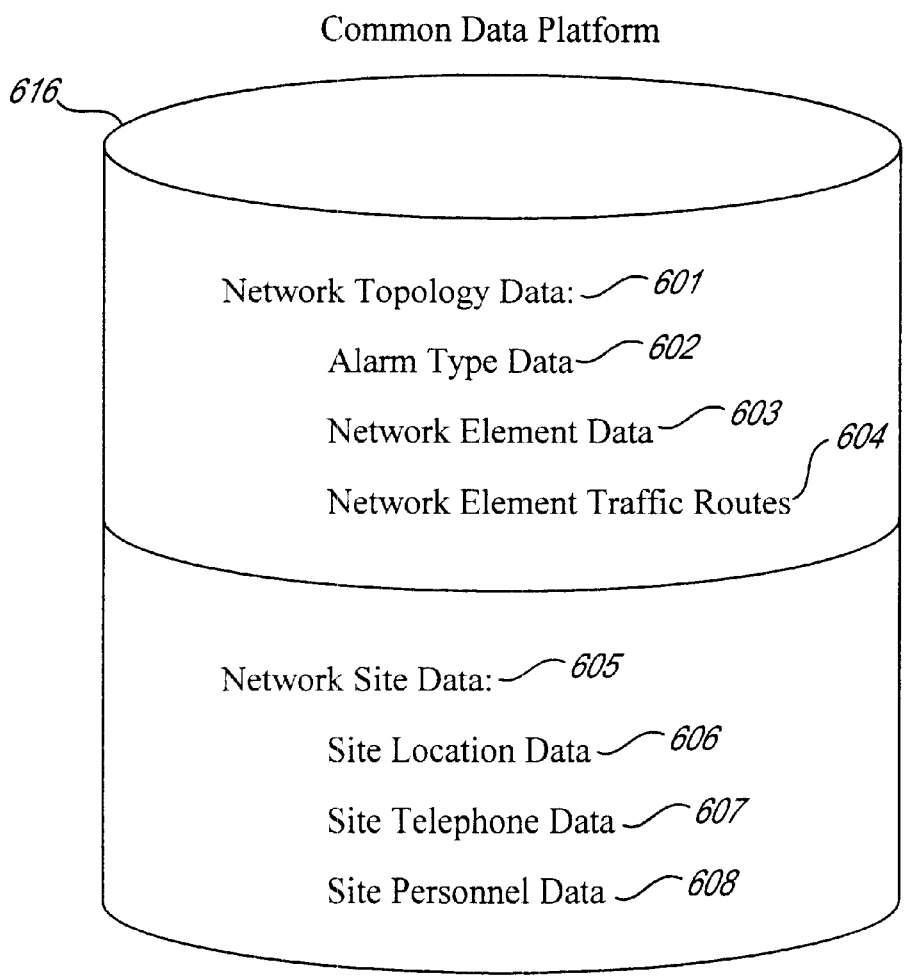
FIG. 6 is a block diagram of example data stored in a CDP data repository.

FIG. 6 is a block diagram of example data stored in a CDP data repository. The CDP data repository 616 contains network topology data 601 and network site data 605. The CDP may be implemented as a database or a data warehouse containing a company's network topology data and network site data used among systems such as provisioning, restoration, engineering, planning, and network management. The network topology data 601 and network site data 605 may comprise information such as information on a particular type of alarm 602, the logical placement of a network component 603, network traffic route information 604, network site location data 606, network site telephone data 607, and network site personnel data 608. One skilled in the art will recognize that additional and other data may be included in the CDP data repository 616. On a nightly basis, the workflow LCA performs a download of all or selected data from the CDP, and stores it in memory. This network data is then used to enhance alarm reports that are selected by the network monitor and retrieved from the network management system.

Figure 7:
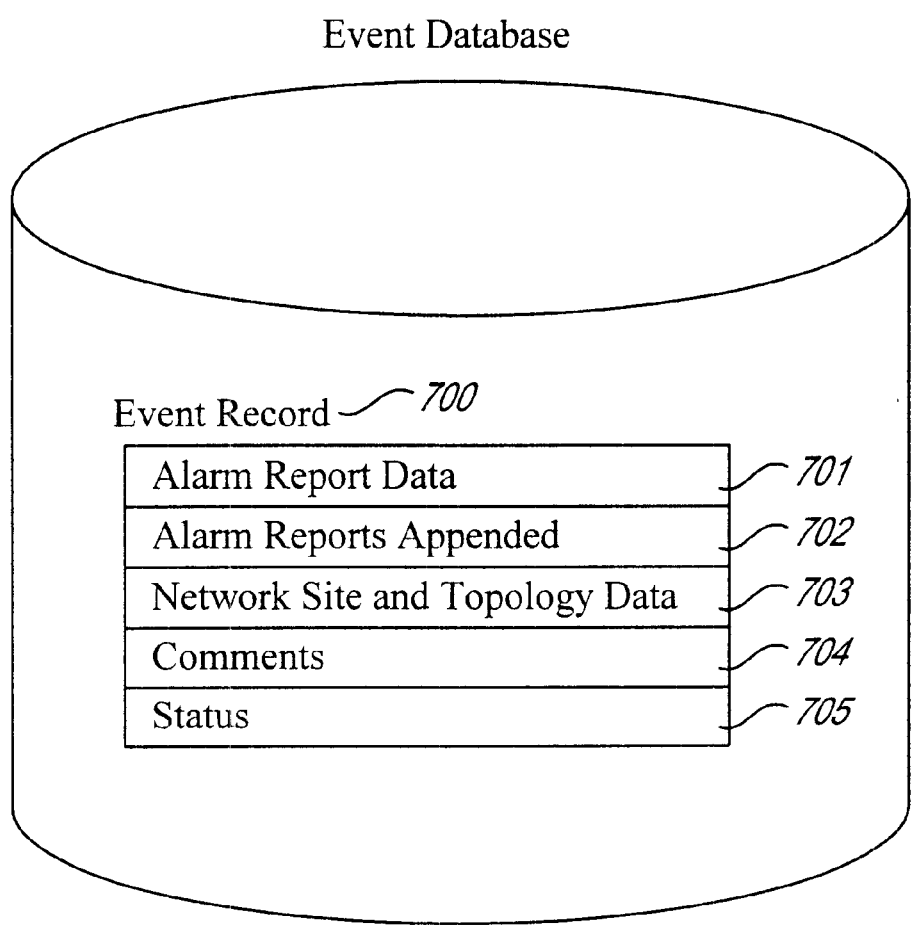
FIG. 7 is a block diagram of an example event record stored in an event database.

FIG. 7 is a block diagram of an example event record stored in an event database. The event record 700 comprises alarm report data 701, the appended alarm reports 702, the appended network site and topology data 703, comments added by the network monitor 704, and any relevant status information 705. As discussed with reference to FIG. 4, the workflow LCA 412 creates an event report in event database 415, writes the selected alarm report data onto the event record, and adds additional data derived from the CDP.

Figure 8:
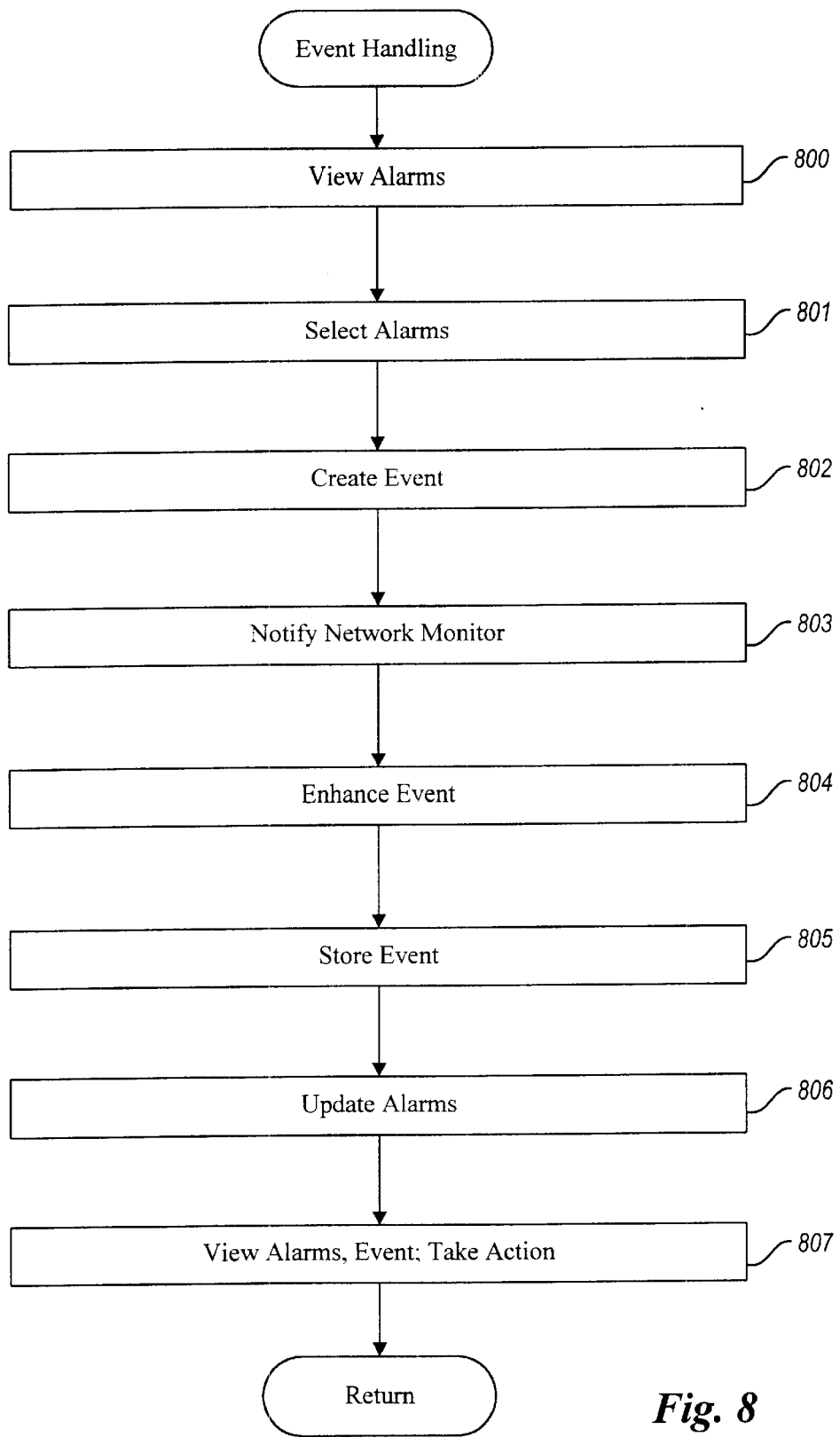
FIG. 8 provides a flow diagram illustrating a typical event-handling process performed using the automated workflow system.

FIG. 8 provides a flow diagram illustrating a typical event-handling process performed using the automated workflow system. In summary, a network monitor creates an event report to represent an occurrence on the telecommunications network of an anomaly that has resulted in the generation of one or more alarms. If the event reflects a defect in the telecommunications network, the network monitor may create a trouble ticket against the event to resolve the anomaly.

Specifically, the network monitor views a table of alarm reports (step 800). The network monitor can observe a certain geographic region and can view the alarms generated from their assigned region. The network monitor can also view both alarm reports that have been handled and those that have not been handled. Each alarm report in a network management system may have an attribute indicating anomaly status. Once the network monitor has assigned an alarm report to an event, the workflow LCA updates each alarm report to indicate that its anomaly status is "handled", meaning the alarm report has been assigned to an event. The network monitor can determine which alarm reports have been handled, because the "handled" status is displayed in the alarm report. In this manner, the automated workflow system enhances monitoring capacities because conventional network monitoring environments do not typically allow a network monitor to set an alarm report's status to "handled". The automated workflow system allows a network monitor to select alarm reports and to assign them to an event. This action causes the automated workflow system to set each alarm report's status to "handled".

When the network monitor determines that one or more unhandled alarm reports contribute to an event, the network monitor selects those alarm reports (step 801). The network monitor then selects a "create event" function (step 802). This action automatically brings up an event report in the client GUI. The event report is automatically populated by the automated workflow system with selected alarm reports and other data. The network monitor can further complete fields in the event report such as the event type field. The automated workflow system automatically assigns a default priority to the event based on the event type.

The network monitor receives confirmation of the event report's creation in the event database from the notification manager. The notification manager identifies the network monitor assigned to the event by reference to the network monitor table, then writes a message to a notification table in the client GUI of the identified network monitor (step 803). The network monitor receives this message and may select a function to view the event report.

The network monitor may enhance an event with additional data (step 804), and then direct that the enhanced event be stored in the event database (step 805). In support of the network monitor's event report enhancement, the automated workstation system adds to an alarm report a site identifier that identifies the location of the network component which generated the alarm. This site identifier is displayed for the network monitor with the alarm report in the event report on the client GUI. By selecting this site identifier, the network monitor can cause the client GUI to automatically bring up that site's catalog record in the station manager. The catalog record provides the network monitor with site information, such as contact names and telephone numbers.

When the network monitor views the new event in the client GUI, the network monitor can select an option to confirm receipt of the event by the network management system. The workflow LCA instructs the network management system to set each selected alarm report's status attribute to a "handled" status, which is subsequently displayed to the network monitor when the confirm receipt option has been selected. The workflow LCA handles updates to an alarm report's status, such as the assignment of the alarm report to an event (step 806). The network monitor's display also may include the event report number associated with the alarm report or provide some other indicator which associates the event report to the alarm report.

In addition to sending a "handled" message, the client GUI generally transmits five types of messages. The handled message has been described above. A "release" message instructs the computerized server to release an alarm report from an event report. A "terminate" message instructs the computerized server that an event report has been closed and to update an alarm report's status to remove the alarm from presentation. A "show status" message occurs when a network monitor selects the "refresh" option from the client GUI. This message instructs the computerized server to provide the network monitor with the updated status and state of selected alarm reports. A "show derived" message provides the network monitor with the alarm report data for alarms that contributed to a derived alarm, or the primary cause of a series of alarms.

The network monitor can now view the event report in the client GUI and view the updated alarms ("handled") using the network management system (step 807). Network monitors may also have different types of alarm report status shown in different colors (e.g., to indicate "handled").

A network monitor after creating an event report can open a trouble ticket against that event report. This is done with the client GUI which provides functions for selecting event report and trouble ticket functions. The client GUI also provides functions for comments, remarks, and activities. The network monitor first selects an event report, which causes the client GUI to display the corresponding event report. The event report will have one or more alarm reports listed. The network monitor selects one alarm report. This is the primary alarm report that is used to populate data into a trouble ticket. The network monitor then selects a "create ticket" option. The client GUI automatically displays the trouble ticket. The trouble ticket is automatically populated with the primary alarm report's data and is assigned to the selected event. The client GUI, using the computerized server, updates the event report in the event database by writing and assigning the trouble ticket to the event.

Figure 9:
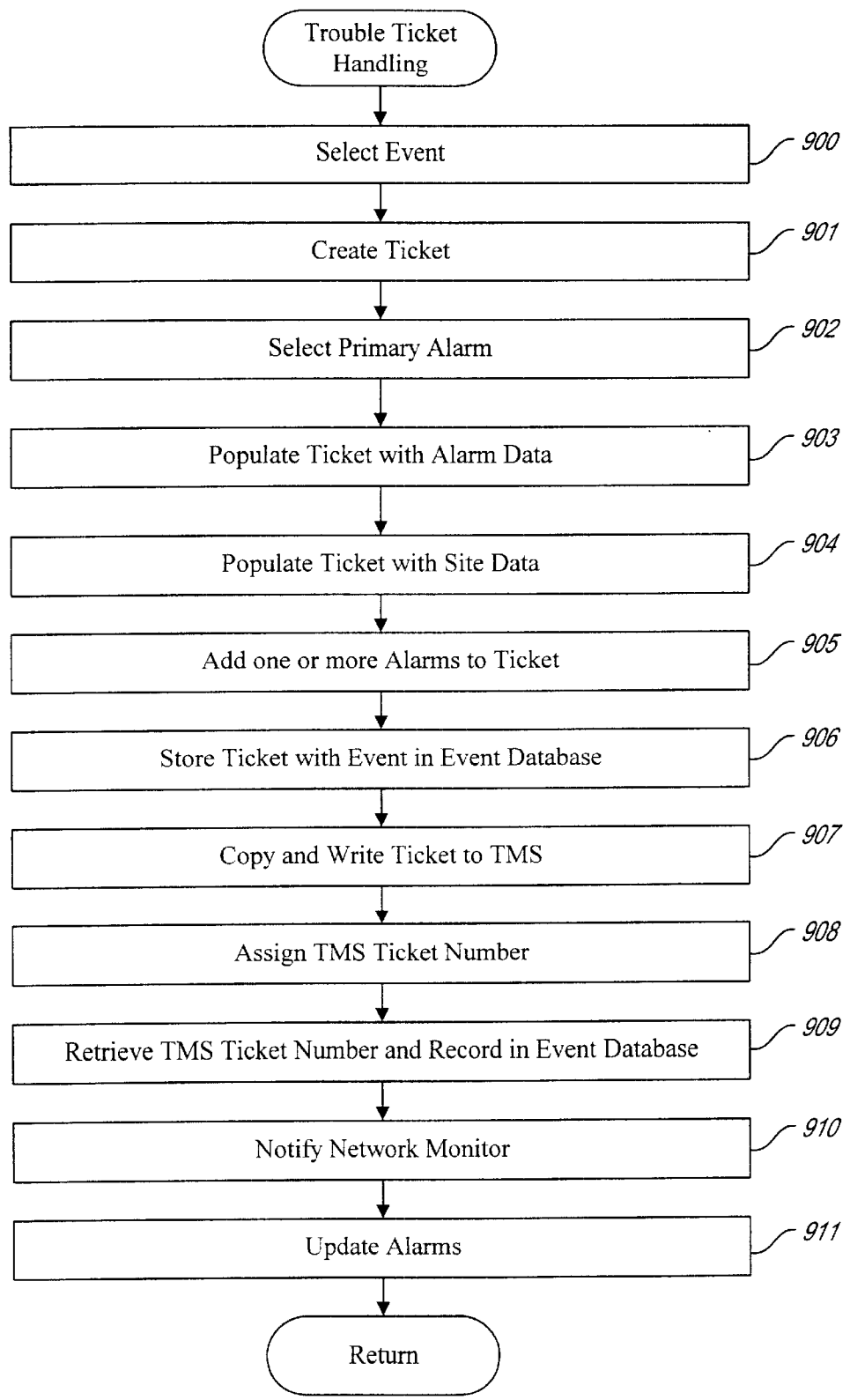
FIG. 9 is a flow diagram illustrating the handling of trouble tickets performed by the automated workflow system.

FIG. 9 is a flow diagram illustrating the handling of trouble tickets performed by the automated workflow system. A network monitor creates a trouble ticket as a means of communicating an anomaly that is associated with an event to a field engineer. A trouble ticket is typically created against a single event and is logged with the event report in the event database. Once a trouble ticket is created, its status is monitored by elements of the automated workflow system such as the gateway. As changes in status are received, the automated workflow system correspondingly updates associated event and alarm reports.

Specifically, to create a trouble ticket, a network monitor first selects an event by opening an event report using the client GUI (step 900). The network monitor then selects a creation function which causes the client GUI to open a trouble ticket form (step 901). The network monitor is then prompted to select a primary alarm report for the event (step 902). Although multiple alarm reports may be associated with a single ticket, the ticket is created against the primary alarm report. The trouble ticket is automatically populated by the automated workflow system with alarm report data (step 903). The automated workflow system populates the report by retrieving data from the event database and other components. The data includes not only the data provided by network management system, but also the topology and site data provided by the workflow LCA through the CDP. Each alarm report is assigned a site identifier by the automated workflow system through an element such as the CDP. The client GUI uses the assigned site identifier to retrieve data from that site's catalog record in the station manager (step 904). The data typically includes one or more of a site contact, telephone number, or other data which might be required for the proper resolution of a network anomaly. The network monitor may desire to add one or more alarm reports to the trouble ticket to represent a collection of alarm reports that comprise a single event (step 905). In some embodiments of a network management system (see, for example, network management system 400 in FIG. 4), an automatic alarm correlation engine may be provided. The correlation engine is used to group (correlate) several alarms and create a "derived" alarm, which is an alarm that represents the primary anomaly for a series of alarms. A derived alarm is useful in reducing multiple alarms to a single alarm. When the automated workflow system of the present invention is implemented in connection with such a network management system, the network monitor can select a derived alarm as the primary alarm used to create the trouble ticket. In addition, the network monitor can select a function to add to the trouble ticket of the original alarms that contributed to the derived alarm. To perform this function, the client GUI sends a "Show Derived" message to the workflow LCA. The workflow LCA retrieves the original alarm reports data, and sends it to the client GUI to add it to the ticket. When the network monitor has finished creating the trouble ticket, the client GUI stores the ticket with the event report in the event database (step 906).

Steps 907–911 represent the trouble ticket handling process performed by the automated workflow system to support a connected service management system, such as TMS 405 in FIG. 4. When a ticket is recorded in the event database by the client GUI, the client GUI automatically triggers the gateway process to retrieve and copy the trouble ticket. The gateway process creates a ticket in the TMS and copies the ticket data to the TMS trouble ticket (step 907). As mentioned earlier, the gateway process is a store and forward application, so that if communications with TMS are interrupted, the gateway process stores all information received from the computerized server, until communications are restored. The gateway process then forwards to the TMS all information previously stored. The TMS assigns a TMS ticket number to the newly created TMS ticket (step 908). When a TMS ticket number is assigned to the TMS ticket, the gateway process retrieves this TMS ticket number and sends the TMS ticket number to the corresponding trouble ticket in the event database (step 909). The trouble ticket in the event database is then updated by the gateway through the communications server to include the TMS ticket data, as well as the TMS ticket number. The gateway process also writes a message to the message table in the event database to indicate an event report update. Eventually, the notification manager receives the message and writes a corresponding message to the notification table in the client GUI to notify the network monitor of the new TMS ticket number (step 910). In addition to causing the event report in the event database to be updated with the TMS ticket number, the gateway process calls a function in the client GUI to notify the workflow LCA of the new TMS ticket number. In response, the workflow LCA updates the alarm reports in the network management system that are associated with the trouble ticket to indicate the TMS ticket number (step 911). Once this process has been completed, the alarm reports that are provided to the network monitors show the corresponding TMS ticket numbers. This feature enhances the network monitor's communications with field engineers or with other users of the TMS.

Figure 10A:
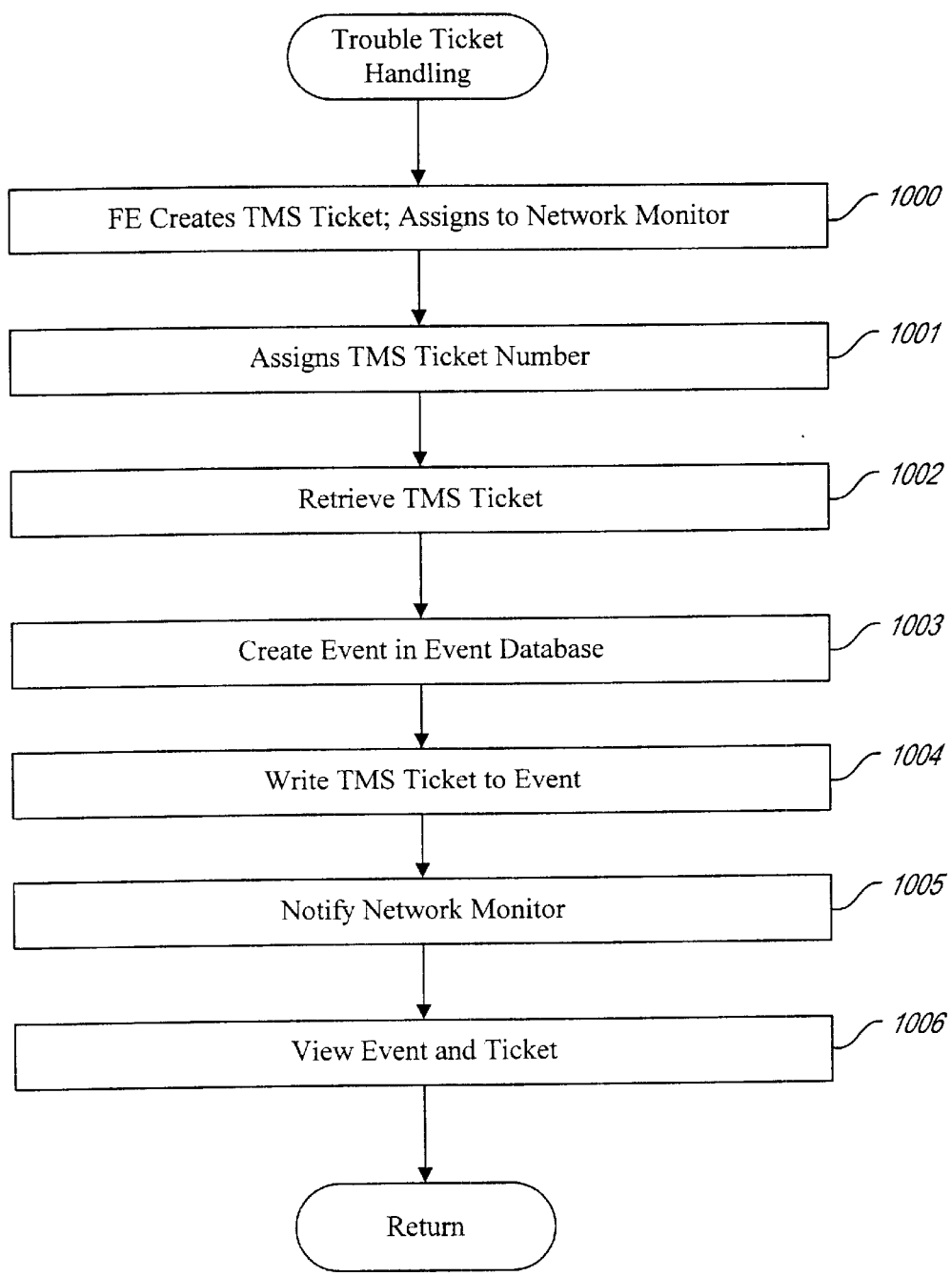
FIG. 10a is a flow diagram illustrating an alternative embodiment for the creation of trouble tickets.

FIG. 10a is a flow diagram illustrating an alternative embodiment for the creation of trouble tickets. According to this embodiment, a field engineer ("FE") creates a ticket directly in TMS and assigns the ticket to a network monitor. The automated workflow system then automatically notifies the network monitor of the TMS ticket assignment. Specifically, the field engineer creates a trouble ticket in TMS and assigns it to a network monitor (step 1000). TMS assigns a TMS ticket number to the ticket (step 1001). The TMS then notifies the gateway process that a TMS ticket has been assigned to a network monitor. In response, the gateway process retrieves the TMS ticket (step 1002). The gateway process then calls a routine to create a new event in the event database (step 1003) and calls a routine to attach the TMS ticket data to the event report (step 1004). The gateway process also calls a routine to write a notification message to the message table. In one embodiment, these routines are provided by an application programming interface to the event database. Eventually the notification manager receives the notification message and, from the network monitor table, identifies the network monitor to which the TMS ticket is assigned. The notification manager then writes a message to the notification table in the client GUI to notify the network monitor of the event report and the trouble ticket (step 1005). The network monitor receives the notification message, selects a function to view the event report, and selects an option to view the trouble ticket (step 1006).

Figure 10B:
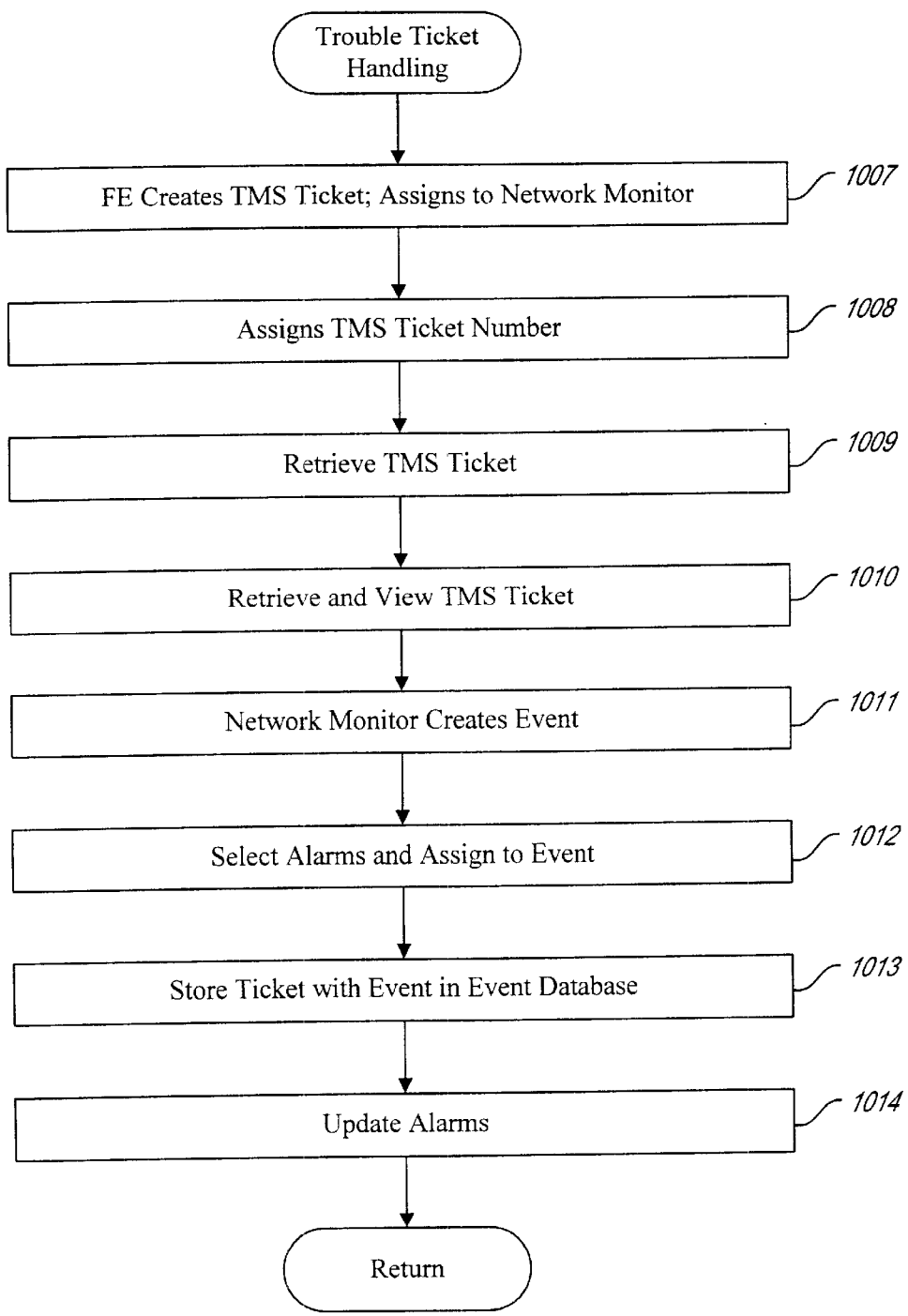
FIG. 10b is a flow diagram illustrating another alternative embodiment for the creation of trouble tickets.

FIG. 10*b* is a flow diagram illustrating another alternative embodiment for the creation of trouble tickets. According to this embodiment, the network monitor is notified by an external mechanism that a TMS ticket has been created and assigned to the network monitor. This situation would typically arise, for example, from a telephone call from a field engineer or from the network monitor logging into a TMS. The network monitor then creates the event report and assigns the TMS ticket to the event report.

Specifically, the field engineer creates a trouble ticket in TMS and assigns it to a network monitor (step 1007). The TMS assigns a TMS ticket number to the trouble ticket (step 1008). TMS then notifies the gateway process that a TMS ticket has been assigned to the network monitor, and the gateway process retrieves the TMS ticket (step 1009). Upon a network monitor request, the client GUI retrieves the TMS ticket from the gateway process and displays it to the network monitor (step 1010). The network monitor creates an event report in the client GUI (step 1011). The network monitor selects alarm reports from the network management system and then assigns these alarm reports to the event report (step 1012). The network monitor assigns the TMS trouble ticket to the event report, and stores the trouble ticket and event report in the event database (step 1013). The client GUI calls on the client process to send a "handled" message to the workflow LCA to update the selected alarm reports in the network management system to indicate a "handled" status (step 1014).

As described hereinabove, in one embodiment, the automated workflow system provides a rules manager (for example, rules manager 417 in FIG. 4) to automate much of the event handling and trouble ticket handling. An exemplary rules manager provides sufficient rules to enable semi-autonomous functioning of the overall system. As an example of the semi-autonomous embodiment of the present invention, the automated workflow system can be adapted to assume a network monitor's duties regarding intrusion alarms. In this embodiment, a system component, such as the rules manager, automatically scans all incoming alarm reports for alarm reports that indicate an intrusion anomaly within the telecommunication network. For example, the occurrence of an intruder accessing a network monitor workstation should trigger an alarm indicative of an intrusion anomaly. This alarm will pass through the network monitoring environment and arrive at the automated workflow system as an alarm report from the network management system. During the scanning of all incoming alarm reports, when the rules manager identifies an alarm report representing an intrusion anomaly, the rules manager itself receives the alarm report. Based upon predetermined rules executed by the rules manager, the rules manager may determine that personnel should be dispatched to the location where the intrusion anomaly was detected.

Through the computerized server, the rules manager notifies the other components of the automated workflow system of this alarm report. The automated workflow system then automatically creates an event report, appends the alarm report for the intrusion anomaly to the event report, and may append to the alarm report additional information, such as data regarding the site of this anomaly. Once the event report has been created, the workflow LCA instructs the network management system to mark this alarm report as handled. The automated workflow system then prepares a trouble ticket for the TMS suitable for resolving the intrusion anomaly or may contact a predetermined facility capable of dispatching appropriate personnel to the location of the intrusion anomaly (e.g., a local police department). The automated workflow system then waits for a response indicating receipt of the trouble ticket or dispatch request. The automated workflow system automatically collects all update information received regarding the status of this event report. When the automated workflow system receives an indication that the intrusion anomaly has been resolved, such as by the arrival of the police or field engineers, then the automated workflow system automatically closes the event in the event database and clears the alarm report in the network management system.

In yet another embodiment of the present invention, the rules manager provides sufficient rules to enable a fully autonomous system, with no requirement for human network monitors. Given the relatively faster speed of a computerized system versus that of a manually operated system, the additional time savings provided by such a semi-autonomous or fully autonomous system may result in a significantly more robust telecommunications network. In addition, a fully automated system would reduce personnel costs.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method in a telecommunications system for automating the dissemination of alarm data generated by at least one network element within a telecommunications network that indicate anomalies in the network, the method comprising the computer-implemented steps of:

receiving alarm data from the one network element of the network;

generating a plurality of alarm reports that correspond to the received alarm data, an alarm report indicating an occurrence of an anomaly and containing alarm data;

designating an alarm report as associated with an event, the event indicating a logical group of alarm data;

updating a status of the designated alarm report to indicate that the designated alarm report has been associated with the event; and generating an event report that corresponds to the event and automatically incorporates alarm data from the designated alarm report that is associated with the event.

2. The method of claim 1, further comprising the steps of:
receiving indication that the event requires notification to a service management system; and
in response to the received indication,
generating a service report that automatically incorporates alarm data from the event report; and
providing the service report to the service management system.

3. The method of claim 2 wherein the service management system is a trouble management system that facilitates dispatching of service personnel.

4. The method of claim 2, further comprising the steps of:
receiving from the service management system an identifier of the service report; and
annotating the event report with the received identifier.

5. The method of claim 1, further comprising displaying the generated alarm reports to telecommunications monitoring personnel.

6. The method of claim 5 wherein the displaying is performed using a graphical user interface.

7. The method of claim 1, further comprising the steps of:
receiving an indication of the identity of a telecommunications network element associated with an anomaly that has caused certain alarm data to be received; and
annotating the alarm report that corresponds to the certain alarm data to include the received indication of the identity of the telecommunications network element.

8. The method of claim 1, further comprising annotating the generated event report with additional information received from a data repository.

9. The method of claim 8 wherein the additional information includes network site and topology data.

10. The method of claim 1 wherein the alarm data is received from a telecommunications network management system.

11. The method of claim 1, further comprising the steps of:
receiving an indication that a service report has been generated by a service management system; and
in response, automatically generating an event report that corresponds to the indicated service report.

12. The method of claim 11 wherein the received indication includes an indication of service data associated with the generated service report, and further comprising, automatically incorporating the indicated service data into the generated event report that corresponds to the indicated service report.

13. The method of claim 1, further comprising automatically updating the generated alarm reports to include status information.

14. The method of claim 13 wherein the status information indicates that a corresponding event report has been generated.

15. The method of claim 1, further comprising using a rules-based system to perform at least a portion of the steps.

16. A method for automating the production of service reports for use in an external service management system that is associated with a telecommunications network and a network site and topology data repository, the method comprising the steps of:
creating a service report according to a format suitable for processing by the service management system;
incorporating alarm report information received from at least one network element within the telecommunications network in the created service report;
incorporating in the service report network site and topology data that is received from the network site and topology data repository; and
automatically creating an event report that corresponds to the created service report, the event report indicating a logical group of the alarm report information and incorporating the alarm report information that is associated with the event, astatus of the alarm reports of the logical group being updated to indicate the alarm reports of the logical group have been associated with the event.

17. The method of claim 16 wherein the service report is created in the service management system.

18. The method of claim 16 wherein the service report is externally created and received by the service management system.

19. The method of claim 16 wherein the service management system is a trouble management system.

20. A workflow integration system for disseminating error information in a computer system associated with a telecommunications network, wherein the error information is generated by at least one network element within the telecommunications network, comprising:
a computer memory configured to receive data representing alarm reports that correspond to alarms generated by the network element of the telecommunications network;
a graphical user interface for depicting the received alarm reports;
a selection mechanism for selecting and grouping individual alarm reports together to from a designated alarm report; and
an event report generator that creates an event report that corresponds to the designated alarm report, automatically incorporates data form the grouped individual alarm reports into the event report and updates a status of the designated alarm report to indicate that the designated alarm report has been associated with the event.

21. The workflow integration system of claim 20, further comprising:
a network site and topology data repository that includes data describing the telecommunications network; and
a retrieval tool for retrieving data from the network site and topology data repository and incorporating the retrieved data in the created event report.

22. The workflow integration system of claim 20, further comprising a service report generator that automatically creates a service report that corresponds to the event report, the service report including information used to correct the error information.

23. The workflow integration system of claim 22 wherein the service report generator generates the service report within a trouble management system.

24. The workflow integration system of claim 20 wherein the alarm reports are generated by a telecommunications network management system.

25. The workflow integration system of claim 20 wherein the alarm reports are received and processed autonomously.

26. A workflow integration system for dissemination of anomalies generated by at least one network element of a telecommunications network that is described in a network site and topology database, comprising:
a computerized receiver for receiving alarm reports from the network element of a telecommunications network, the alarm reports containing anomaly information;

a computerized selector for selecting and grouping individual alarm reports together to form an event report, the event report indicating a logical group of the alarm reports and incorporating the anomaly information from the alarm reports that is associated with the event, a status of the group of the alarm reports being updated to indicate that the group of the alarm reports have been associated with the event; and a computerized retrieval system for retrieving data from said network site and topology database and incorporating the retrieved data in the event report.

27. The workflow integration system of claim 26 wherein anomalies of the telecommunications network are tracked by a service management system, and further comprising a computerized transformation system for transforming the event report into a service report for processing by the trouble management system.

28. The workflow integration system of claim 26 wherein operations of the telecommunications network are monitored by network monitors, and further comprising a graphical user interface for depicting the alarm reports to the network monitors.

29. The workflow integration system of claim 28 wherein the network monitors are automated processes.

* * * * *